United States Patent Office 3,222,370
Patented Dec. 7, 1965

3,222,370
4-PHENALKYL-1-DIALKYL-AMINO-ALKYL-PIPERIDINES
Chester John Cavallito and Allan Poe Gray, Decatur, Ill., assignors to Neisler Laboratories, Inc., Decatur, Ill., a corporation of Delaware
No Drawing. Filed Jan. 16, 1962, Ser. No. 166,694
6 Claims. (Cl. 260—293)

This invention relates to compositions of matter classified in the art of chemistry as aralkyl-dialkylamino-alkylpiperdines and to processes for making and using such compositions. This application is a continuation-in-part of our copending application 593,058, filed June 22, 1956, now abandoned.

The invention sought to be patented, in its composition aspect, is described as residing in the concept of a chemical compound having a molecular structure in which a phenylalkyl moiety is attached to the 4-position of a 1-(di-lower-alkylaminoalkyl)-piperidine.

The tangible embodiments of the composition aspect of the invention, in their free base form are high boiling liquids or low melting, white crystalline solids; are substantially insoluble in water; are soluble in aqueous mineral or organic acids from which the acid salts may be obtained on evaporation of the water; and, are soluble in polar and non-polar solvents such as lower aliphatic alcohols, chloroform, benzene and petroleum ether.

The tangible embodiments of the invention possess the inherent applied use characteristics of exerting an anti-ather-osclerotic effect and of potentiating the anti-hypertensive action of veratrum alkaloids.

The tangible embodiments of the composition aspects of the invention, in their free base form, have the generalized structure

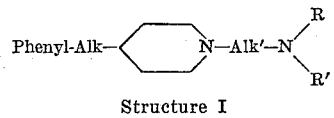

Structure I wherein Alk represents an alkylene bridge containing one to three carbon atoms, Alk′ represents an alkylene bridge containing two to three carbon atoms, and R and R′ represent the same or different lower-alkyl groups, which can be joined to form a heterocyclic ring as in pyrrolidine, piperidine and morpholine.

The simplest molecular structure within the scope of this invention is:

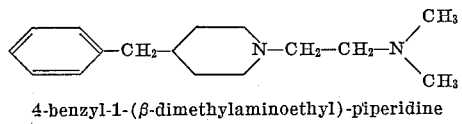

4-benzyl-1-(β-dimethylaminoethyl)-piperidine
Structure II

In said generalized structure or elsewhere within the description of this invention, the terms "alkyl" or "Alk," as they appear in the terms "phenylalkyl" or "Phenyl-Alk," refer to a straight or branched alkylene chain containing one to three carbon atoms; the terms "alkyl" or "Alk′" as they appear in the terms "di-lower alkyl-aminoalkyl" or

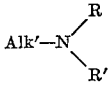

refer to an alkylene bridge, containing between 2 and 3 carbon atoms; and, the term "lower-alkyl" refers to straight or branched chain alkyl radicals having one to four carbon atoms, inclusive, among which are, for purposes of illustration but without limiting the generality of the foregoing, methyl, ethyl, n-butyl, isopropyl and s-butyl.

The phenyl ring includes, as the full equivalent thereof, the unsubstituted phenyl radical and such radicals bearing on the ring, in place of a hydrogen atom or atoms, one or more simple substituents not adversely affecting the pharmacological properties of the above generalized structure, which includes, for purposes of illustration but without limiting the generality of the foregoing, halo, lower-alkyl, lower-alkoxy, methylenedioxy, amino, nitro, trihalomethyl, hydroxy, mercapto, lower-alkylthio and other groups commonly used in the art as phenyl substituents.

The piperidine ring may have lower-alkyl substituents as well as the phenylalkyl substituent hereinbefore described. Such lower-alkyl derivatives are to be considered full equivalents of the unsubstituted compound of this invention.

Representative 4 - phenylalkyl-1-(di-lower-alkylamino-alkyl)piperidines that are suitable examples of this invention include for purposes of illustration, but without limiting the generality of the foregoing, 4-p-chloro-phenethyl-1-(β - diisopropylaminoethyl-piperidine, 4-(3,4-methylenedioxyphenethyl) - 1 - (γ - piperidinopropyl)-piperidine, 4 - (3,4,5 - trimethoxphenethyl) - 3-ethyl - 1 - (β - diethylaminoethyl) - piperidine, 4 - (α - phenyl - propyl) - 1 - (γ - pyrrolidinopropyl) - piperidine, 4 - (β-phenylpropyl) - 1 - (β - diethylaminopropyl) - piperidine, 4-(α-phenylethyl-1-(β-piperidinopropyl)-piperidine.

The phenylalkyl-di-lower alkylaminoalkyl-piperidines of the present invention in their free base form, are most conveniently prepared by the reaction of 4-phenylalkyl-piperidine with di-lower-alkylaminoalkyl ester of the type generally used as an alkylating agent in the presence of an acid acceptor such as sodium carbonate, potassium carbonate, etc.:

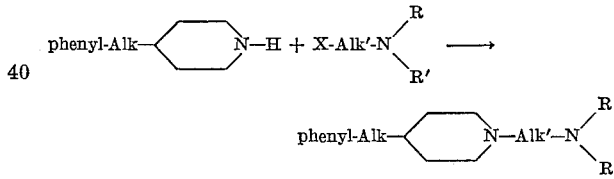

wherein phenyl, Alk, Alk′, R and R′ have the same meaning as in the above generalized structure I, and X=a chlorine, bromine or iodine atom, or a sulfonate ester group.

The acid-addition salts of the compounds of the invention can be prepared in the conventional manner by reacting the free bases of the invention with the usual inorganic acids, which include, for purposes of illustration but without limiting the generality of the foregoing, hydrochloric, hydrobromic, hydriodic, sulfuric, and phosphoric; or organic acids, which include, for purposes of illustration but without limiting the generality of the foregoing, acetic, tannic, citric, malic, ethanesulfonic, cyclohexylsulfamic, et cetera. These salts are to be regarded as the full equivalents of the free bases, since they represent merely convenient forms in which to administer the compounds for the pharmacological purposes herein set forth.

The best mode contemplated by the inventors of carrying out their invention will now be set forth as follows.

EXAMPLE 1.—4-BENZYL-1-(β-DIMETHYLAMINO-ETHYL)-PIPERIDINE

A xylene solution of dimethylaminoethyl chloride obtained from 180 grams (1.25 moles) of dimethylamino-ethyl chloride hydrochloride was added dropwise to a refluxing suspension of 175 grams (1.0 mole) of 4-benzylpiperidine, 104 grams (0.75 mole) of potassium carbonate and 80 grams (0.75 mole) of sodium carbonate in 250 milliliters of xylene. The resultant slurry was refluxed for twenty hours, cooled and water added until all the inorganic salts were dissolved. The aqueous layer was discarded and the xylene solution concentrated. The residual oil was distilled to give 132 grams or a 53.5 percent yield of 4-benzyl-1-($\beta$-dimethylaminoethyl)-piperidine boiling at 110–114 degrees at 0.1 millimeter of pressure $n_D^{24}$=1.5160.

EXAMPLE 2.—4-BENZYL-1-($\beta$-DIMETHYLAMINO-ETHYL)-PIPERIDINE

A stirred suspension consisting of 28.0 grams (0.16 mole) of 4-benzylpiperidine [W.L.C. Veer and St. Goldschmidt, Rec. trav. chim. 65, 793 (1946); C.A. 41, 3101 (1947)], 34.6 grams (0.24 mole) of beta-dimethylaminoethyl chloride hydrochloride and 50.0 grams of anhydrous powdered sodium carbonate in 200 milliliters of n-butyl alcohol was refluxed for 24 hours. The cooled solution was filtered and the filtrate concentrated in vacuo. The residue was diluted with ether, the resultant precipitate filtered off and the filtrate concentrated in vacuo. Vacuum distillation gave a small forerun and 12.3 grams (31 percent of theoretical yield) of 4-benzyl-1-($\beta$-dimethylaminoethyl)-piperidine, boiling at 135–140 degrees centigrade at 0.5 millimeter pressure having a refractive index $n_D^{24}$ of 1.5167.

*Analysis.*—Calculated: N (basic), 11.37. Found: N (basic), 11.22.

The dihydrochloride salt of 4-benzyl-1-($\beta$-dimethylaminoethyl)-piperidine was prepared in the conventional manner and melted above 270 degrees centigrade.

*Analysis.*—Calculated: C, 60.18; H, 8.84; Cl, 22.21. Found: C, 60.50 H, 8.71 Cl, 22.11.

The manner of using the invention sought to be patented in its process aspect will now be described:

It is well known that a large percentage of individuals, particularly those 40 years of age and older, have impaired function of the circulatory system. This is manifested by high blood pressure, decreased arterial, venous and coronary blood flow, etc. Oftentimes the causes of this impaired function are atherosclerotic lesions in the walls of the cardiovascular blood vessels. Present therapy attempts to reduce these lesions or plaques by reducing the concentration of serum cholesterol or of blood lipids. This can be accomplished by adding medicinal agents which interfere with the synthesis of cholesterol. In spite of the success of these agents in reducing cholesterol levels, there is some question as to whether they reduce the atheroclerotic lesions, and, there also is some question as to whether their prolonged use is harmful. Quite unexpectedly, we have discovered that the tangible embodiments of this invention reduce the degree of atherosclerotic plaque formation in animals without a significant effect on serum cholesterol or serum lipid levels.

The toxicity of the compounds was first evaluated in mice and then in dogs with favorable results. By standard pharmacological evaluation procedures, the anti-atherosclerotic activity of the compounds was determined in rabbits. A further property exhibited by our compositions is that they will significantly increase peripheral and coronary blood flow and they potentiate the hypotensive activity of cryptenamine, an alkaloidal fraction obtained from veratrum viride.

Preliminary toxicity studies on 4-benzyl-1-($\beta$-dimethylaminoethyl)-piperidine dihydrochloride were conducted following the usual, well-defined, and standardized procedures as described in the pamphlet "Appraisal of the Safety of Chemicals in Foods, Drugs and Cosmetics," published in 1959 by the Association of Food and Drug Officials of the United States (Hagen, "Acute Toxicity," p. 17; Fitzhugh, "Subacute Toxicity," p. 26; and Fitzhugh, "Chronic Oral Toxicity," p. 36). No significant toxic effcets were observed in doses up to even 20 times those of the effective dosage range of 4-benzyl-1-($\beta$-dimethyl-aminoethyl)-piperidine dihydrochloride. Pilot chronic toxicity studies, which were also conducted according to the usual, and well known procedures, were made and essentially the same results were observed.

Various well known pharmacological procedures were carried out in rabbits to ascertain the anti-atherosclerotic activity of 4-benzyl-1-($\beta$-dimethylaminoethyl)piperidine dihydrochloride. In the preliminary test, experimental atherosclerosis was produced in rabbits by administration of high doses of a combination of epinephrine and thyroxine (Epi-Th) after the method of Friedman, Oester and Davis, Arch. inter. de pharmacodyn. et de Therap., 102:226 (1955), or by feeding the rabbits a high cholesterol diet. The 4-benzyl-1-($\beta$-dimethylaminoethyl)-piperidine dihydrochloride was orally administered in doses ranging from 5 mg. per kg. to 50 mg. per kg. At all doses, the degree of the atherosclerotic plaques was decreased 25–75% as compared to control animals. Following these investigations, 4-benzyl-1-($\beta$-dimethylaminoethyl)-piperidine dihydrochloride was administered to rabbits both prophylactically and after production of experimental atherosclerosis. In both experiments, the degree of the antherosclerotic plaques was reduced significantly.

The effective dosage of the compounds of this invention depends upon the severity, the stage, and the individual characteristics of each case. Generally a dosage range of 2 to 20 mg./kg. of body weight per day constitutes the overall range, with a range of about 2 to 10 mg./kg. per day for the preferred compounds. Specifically, the following represents acceptable total daily doses for 4-phenethyl-1-($\beta$-dimethylaminoethyl) - piperidine dihydrochloride, 0.5–10 mg. per kg.

4 - benzyl - 1 - ($\beta$-diethylaminoethyl)-piperidine dihydrochloride, 1–10 mg. per kg.

4-benzyl - 1 - ($\gamma$-dimethylaminopropyl)-piperidine dihydrochloride, 1–10 mg. per kg.

Representative formulations embodying the composition of Examples 1 and 2 are:

*Tablet formulation*

The following formulation provides for the manufacture of 1000 tablets:

| | Grams |
|---|---|
| (1) 4-benzyl-1-($\beta$-dimethylaminoethyl)-piperidine dihydrochloride | 100 |
| (2) Starch | 65 |
| (3) Lactose | 162.5 |
| (4) Cellulose | 65 |
| (5) Dicalcium phosphate | 97.5 |
| (6) Guar | 13 |
| (7) Magnesium stearate | 5.4 |

Thoroughly mix all ingredients in a pot mill, then slug and pass the slugs through a screen in the bantam mill. Compress the tablets in a conventional tabletting machine to produce tablets weighing 508 mg. and each containing 100 mg. of 4-benzyl-1-($\beta$-dimethylaminoethyl)-piperidine dihydrochloride.

*Capsule formulation*

The following formulation provides for the manufacture of 1000 capsules:

| | Grams |
|---|---|
| (1) 4-benzyl-1-($\beta$-dimethylaminoethyl)-piperidine dihydrochloride | 200 |
| (2) Lactose | 248.5 |
| (3) Magnesium stearate | 1.5 |

Mix active ingredient (1) with the lactose and blend in the magnesium stearate. Fill hard gelatin capsules with 450 mg. each of the blended mixture to produce 1000 capsules each containing 200 mg. of 4-benzyl-1-($\beta$-dimethylaminoethyl)-piperidine dihydrochloride.

*Parenteral formulation*

The following formulation provides for the manufacture of 1000 five cc. vials each containing 100 mg. of active ingredient per cc. as its hydrochloride salt:

| | Grams |
|---|---|
| (1) 4 - benzyl-1-(β-dimethylaminoethyl)-piperidine dihydrochloride | 500 |
| (2) Methyl paraben | 5.0 |
| (3) Water for injection, U.S.P., q.s. 5 liters. | |

Heat 4500 ml. of water for injection to 80° C. and dissolve the methyl paraben. Remove the source of heat and dissolve the active ingredient. Cool to room temperature and q.s. to 5000 cc. Filter to a clear solution, fill into 5 ml., 13 mm. borosilicate vials and stopper with West 124 stopper and cap. Sterilize at 115° C. at 10 lbs. pressure for 30 minutes.

Modifications of the 4 - phenylalkyl - 1-di-lower-alkyl-aminoalkyl-piperidines of the present invention are illustrated by the following:

The compounds of this invention are also useful as intermediate for the preparation of useful pharmaceutical compounds. For example, our copending application 593,058, filed June 22, 1956, describes the preparation of antihyptertensive compounds by the reaction of the compounds of this invention with lower-alkyl halides or methosulfates.

The subject matter which the applicants regard as their invention is particularly pointed out and distinctly claimed as follows:

1. 4 - phenylalkyl-1-(di-lower-alkyl-aminoalkyl)-piperidine wherein alkyl of the phenylalkyl group contains from 1 to 3 carbon atoms and alkyl of the aminoalkyl group contains from 2 to 3 carbon atoms.
2. A composition of matter according to claim 1 in which phenylalkyl is benzyl.
3. 4-benzyl-1-(β-dimethylaminoethyl)-piperidine.
4. 4-phenethyl-1-(β-dimethylaminoethyl)-piperidine.
5. 4-benzyl-1-(β-diethylaminoethyl)-piperidine.
6. 4-benzyl-1-(γ-dimethylaminopropyl)-piperidine.

TABLE I

| Compound | Physical Constants | Carbon, Percent by weight | | Hydrogen, Percent by weight | | Ionic Chlorine, Percent by weight | |
|---|---|---|---|---|---|---|---|
| | | Calculated | Found | Calculated | Found | Calculated | Found |
| 4-phenethyl-1-(β-dimethylaminoethyl)-piperidine. | B.P. 123-135 degrees at 0.6 millimeter, $n_d^{25}=1.5125$. | | | | | | |
| Dihydrochloride salt | M.P. 279 degrees | 61.25 | 61.34 | 9.07 | 9.11 | 21.27 | 21.20 |
| 4-benzyl-1-(β-diethylaminoethyl)-piperidine. | B.P. 111-126 degrees at 0.1 millimeter, $n_d^{25}=1.5130$. | | | | | | |
| Dihydrochloride salt | M.P. 237-239 degrees | 62.23 | 61.80 | 9.29 | 9.28 | 20.41 | 20.42 |
| 4-benzyl-1-(γ-dimethylaminopropyl)-piperidine. | B.P. 130-133 degrees at 0.15 millimeter, $n_d^{25}=1.5123$. | | | | | | |
| Dihydrochloride salt | M.P. 280-282 degrees | 61.25 | 61.37 | 9.07 | 9.12 | 21.27 | 21.33 |

References Cited by the Examiner

UNITED STATES PATENTS

| | | | |
|---|---|---|---|
| 2,508,332 | 5/1950 | Hartmann et al. | 260—293 |
| 2,687,414 | 8/1954 | Cusic | 260—293 |
| 2,962,500 | 11/1960 | Hoffmann et al. | 260—293 |
| 2,986,573 | 5/1961 | Topliss et al. | 167—65 |
| 2,987,442 | 6/1961 | McLean et al. | 167—65 |

OTHER REFERENCES

Gray et al.: Journal Am. Chem. Soc., vol. 79, pages 3805–8 (1957).

Schindler et al.: Pharma. Acta Helv., vol. 24, pages 207–216 (1949).

WALTER A. MODANCE, *Primary Examiner.*

IRVING MARCUS, NICHOLAS S. RIZZO, *Examiners.*